United States Patent [19]

Moench

[11] Patent Number: 4,993,469

[45] Date of Patent: Feb. 19, 1991

[54] DEVICE FOR PROTECTION FROM THE SUN

[75] Inventor: Julius Moench, Wendelstein, Fed. Rep. of Germany

[73] Assignee: Siemens Aktiengesellschaft, Berlin and Munich, Fed. Rep. of Germany

[21] Appl. No.: 327,679

[22] Filed: Mar. 23, 1989

[30] Foreign Application Priority Data

Apr. 18, 1988 [DE] Fed. Rep. of Germany ... 8805107[U]

[51] Int. Cl.$^5$ .............................................. E06B 9/36
[52] U.S. Cl. ............................. 160/168.1; 160/176.1; 160/900; 160/DIG. 17
[58] Field of Search ............... 160/168.1, 176.1, 900, 160/173, 177, 166.1, 172, 5, 1, 7

[56] References Cited

U.S. PATENT DOCUMENTS

| | | | |
|---|---|---|---|
| 2,848,045 | 8/1958 | Bennett | 160/172 |
| 3,054,446 | 9/1962 | Cayton | 160/173 |
| 3,134,428 | 5/1964 | Kehrer et al. | 160/176.1 X |
| 3,157,223 | 11/1964 | Arena et al. | 160/168.1 |
| 3,190,346 | 6/1965 | Arena et al. | 160/172 |
| 3,468,360 | 9/1969 | Payne | 160/176.1 X |
| 3,500,896 | 3/1970 | Endou | 160/168.1 |
| 3,646,985 | 3/1972 | Klann | 160/168.1 |
| 3,789,905 | 2/1974 | Saito | 160/168.1 |
| 4,350,197 | 9/1982 | Haller | 160/166 A |
| 4,688,618 | 8/1987 | Saicheck et al. | 160/900 X |
| 4,742,813 | 5/1988 | Riehl et al. | 126/425 |
| 4,773,464 | 9/1988 | Kobayashi | 160/168.1 |
| 4,841,672 | 6/1989 | Nebhuth et al. | 160/166.1 X |

FOREIGN PATENT DOCUMENTS

| | | |
|---|---|---|
| 0251311 | 1/1988 | European Pat. Off. . |
| 0261304 | 3/1988 | European Pat. Off. . |
| 410360 | 10/1966 | Switzerland . |

*Primary Examiner*—David M. Purol
*Attorney, Agent, or Firm*—Lawrence C. Edelman

[57] ABSTRACT

A vertical Venetian blind employs a plurality of slats adapted to be moved between an open position and a closed position. When the slats are in their closed position, pivotally mounted spacer bars maintain a predetermined center-to-center distance between adjacent slats. A rotatable drive shaft, which is employed to move the slats between their open and closed positions, can be supported along substantially its entire length by a bearing to thereby prevent the drive shaft from sagging.

25 Claims, 5 Drawing Sheets

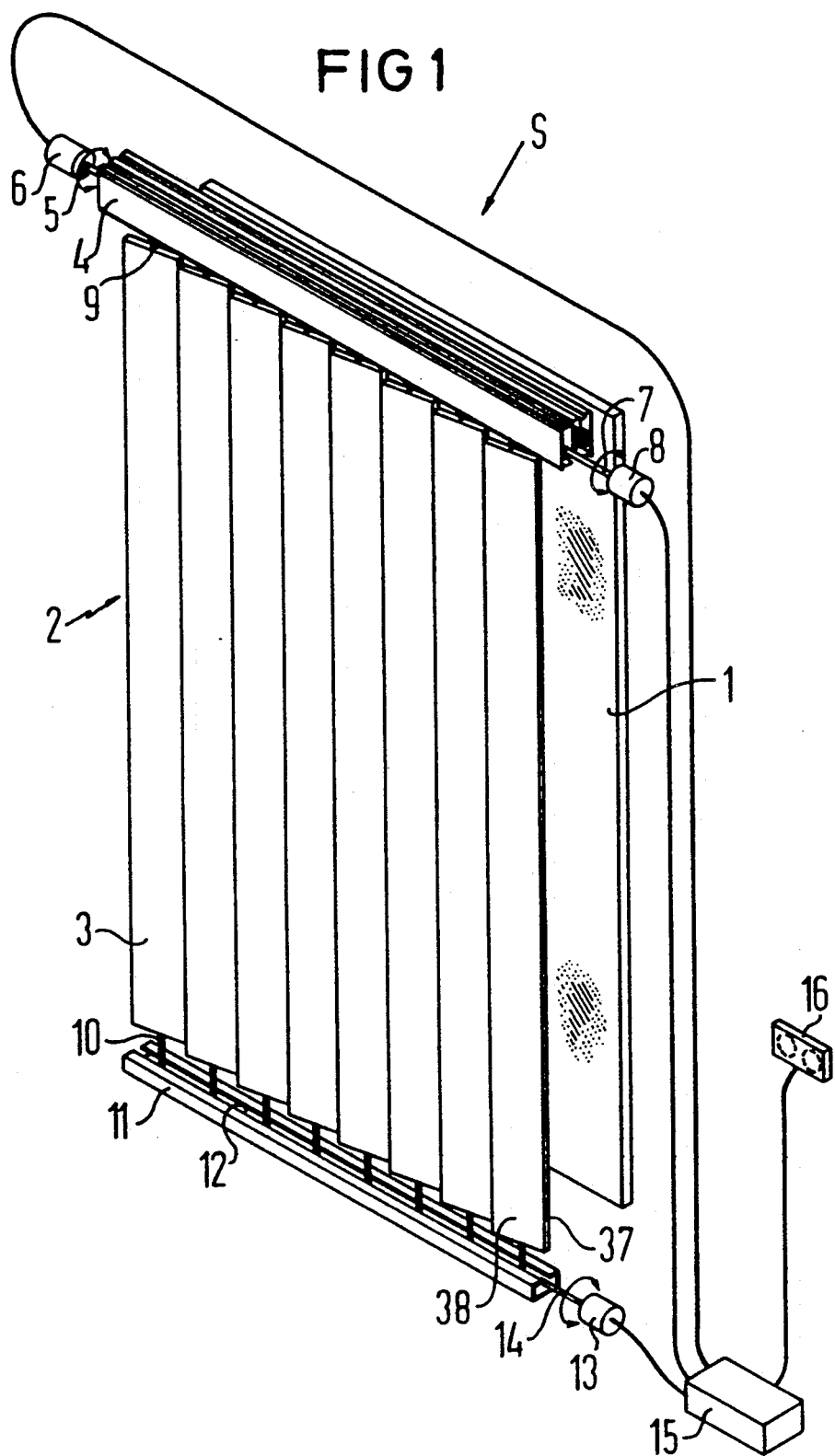

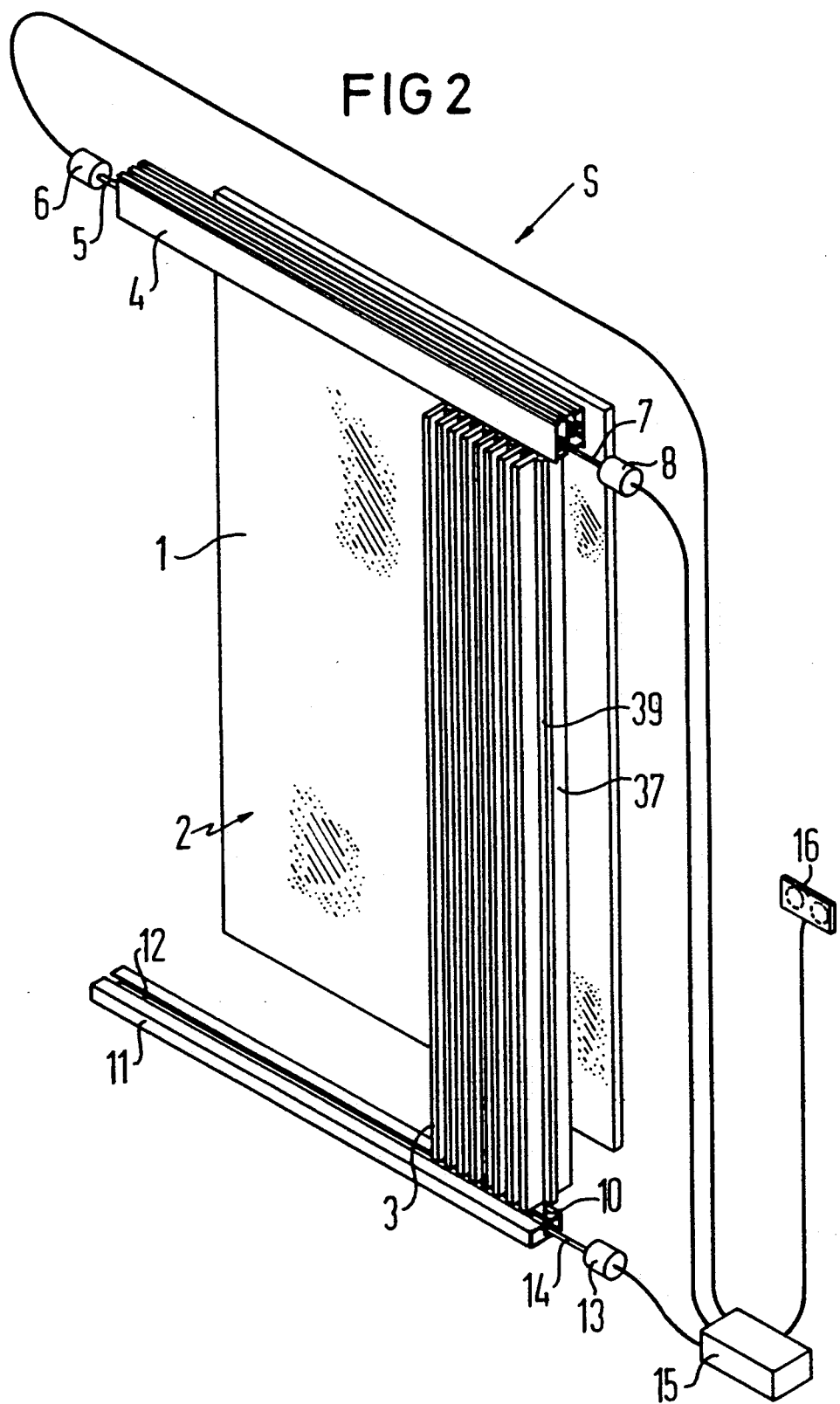

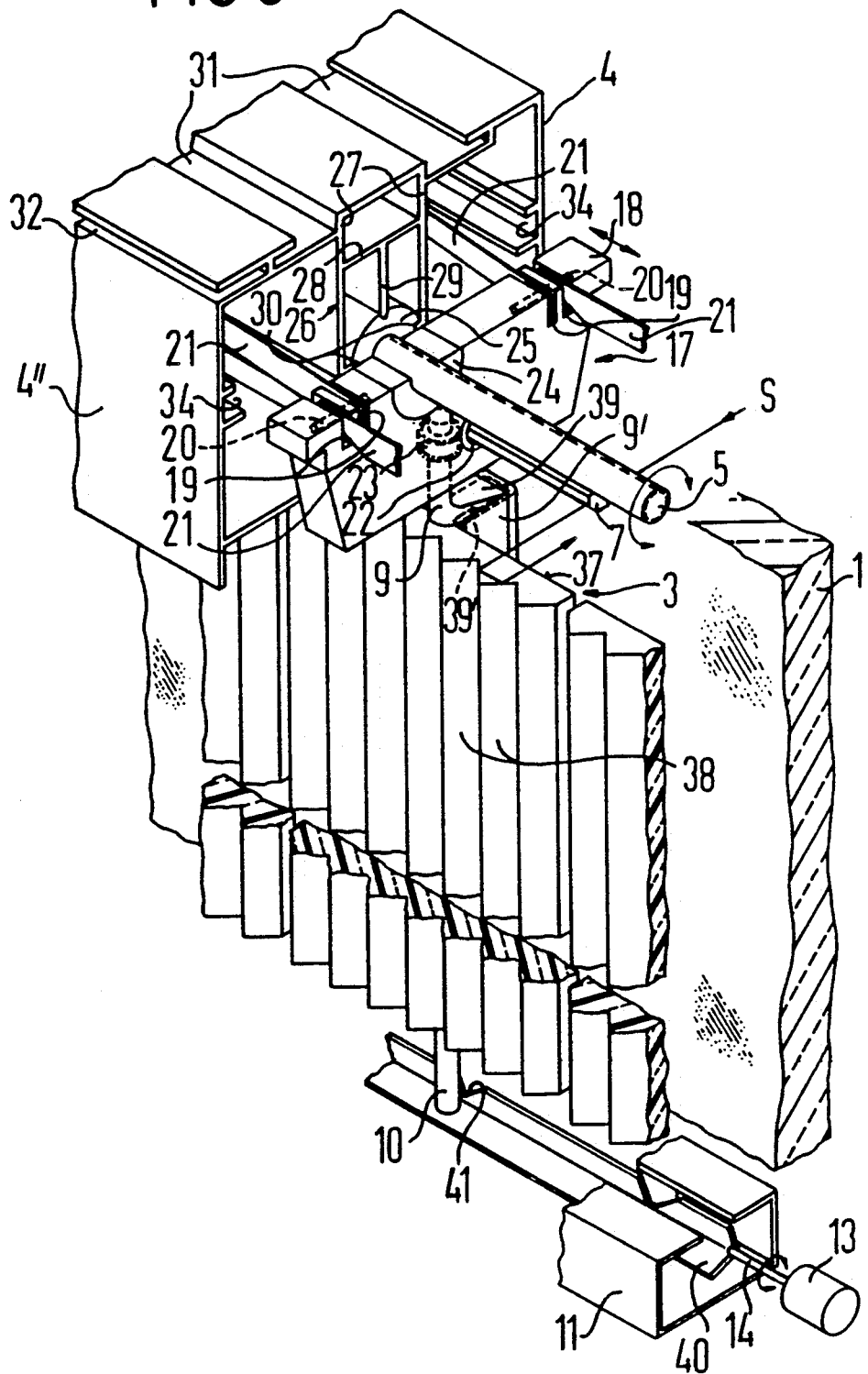

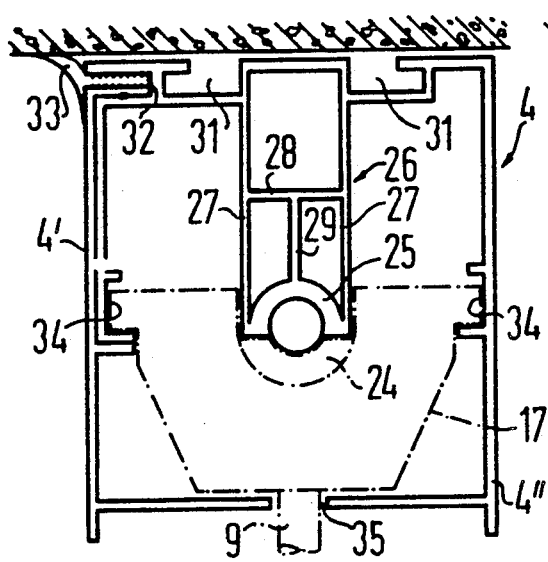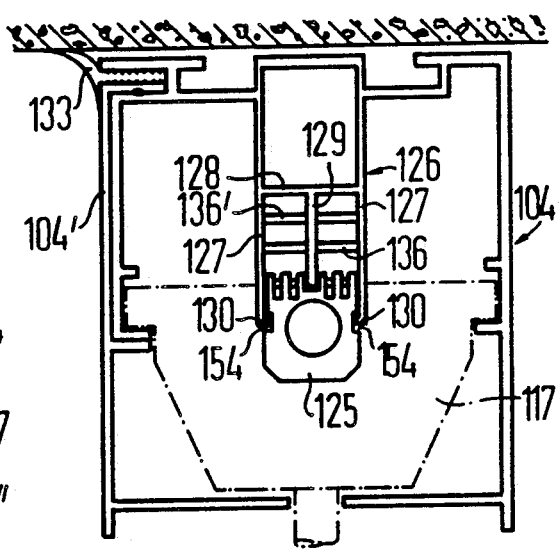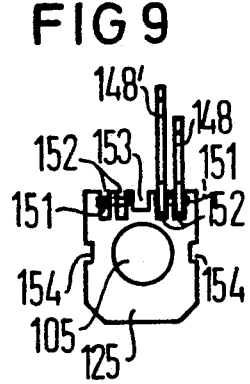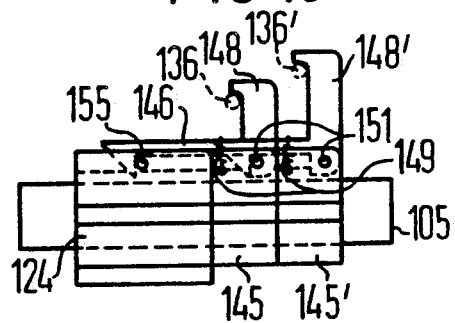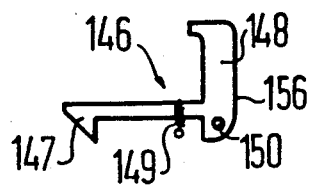

4,993,469

1

DEVICE FOR PROTECTION FROM THE SUN

FIELD OF THE INVENTION

The present invention relates to vertical Venetian blinds, and, more particularly, to such blinds which offer protection from the sun by functioning as a retroreflective sunshield.

BACKGROUND OF THE INVENTION

Horizontal blinds are known which utilize prismatic slats to retro-reflect incoming solar rays (see, for example, U.S. Pat. No. 4,742,813, which is owned by the assignee of the present application, and European Patent Publication No. 0 199 931 A1, which is incorporated herein by reference). In order to effectively use such prismatic slats in connection with vertical Venetian blinds, the blinds must be opened and closed with great precision so that their prismatic slats can be properly positioned with respect to the incoming solar rays. For instance, when the vertical blinds are closed, their prismatic slats must be evenly spaced from each other. Therefore, while it is important that all vertical Venetian blinds be provided with means for spacing their slats with precision, this is especially true in the case of vertical Venetian blinds employing prismatic slats.

SUMMARY OF THE INVENTION

In accordance with one aspect of the present invention, a plurality of slats of a vertical Venetian blind are mounted such that they are moveable between an open position and a closed position. When the slats are in their closed position, pivotally mounted spacer bars interconnect the slats (i.e., couple them together) and maintain a predetermined center-to-center distance between adjacent slats. As the slats are moved from their closed position to their open position, the spacer bars are automatically disengaged by a pivoting action to uncouple the slats.

In accordance with another aspect of the present invention, a rotatable drive shaft adapted to move the slats between their open and closed positions is supported along substantially its entire length by a bearing which is coextensive with the drive shaft to thereby prevent the drive shaft from sagging. The bearing provides additional support to the drive shaft by having a cross-sectional shape selected such that the bearing embraces a major circumferential portion of the drive shaft.

BRIEF DESCRIPTION OF THE DRAWINGS

For a better understanding of the present invention, reference is made to the following description of various exemplary embodiments considered in conjunction with the accompanying drawings, in which:

FIG. 1 is a perspective view of a vertical Venetian blind constructed in accordance with the present invention, the blind being shown in its closed position;

FIG. 2 is a perspective view of the vertical Venetian blind illustrated in FIG. 1, the blind being shown in its open position;

FIG. 3 is as enlarged perspective view of the vertical Venetian blind illustrated in FIGS. 1 and 2, portions being broken away to facilitate consideration and discussion;

FIG. 4 is a transverse cross-sectional view of a guide rail employed by the vertical Venetian blind illustrated in FIGS. 1-3, a carriage assembly supported by the guide rail being shown in phantom to facilitate consideration and discussion;

FIG. 8 is a transverse cross-sectional view, similar to that of FIG. 4, showing an alternate embodiment of a guide rail adapted for use in connection with the vertical Venetian blind of FIGS. 1-3, a carriage assembly supported by the guide rail being shown in phantom to facilitate consideration and discussion;

FIG. 9 is an end elevational view of a slip bearing assembly adapted for use in connection with the guide rail illustrated in FIG. 8;

FIG. 10 is a side elevational view of the slip bearing assembly illustrated in FIG. 9, cooperating elements of the guide rail illustrated in FIG. 8 being shown in phantom to facilitate consideration and discussion; and FIG. 11 is a side elevational view of a latch mechanism employed by the slip bearing assembly illustrated in FIGS. 9 and 10.

DESCRIPTION OF THE EXEMPLARY EMBODIMENTS

Figure 5:
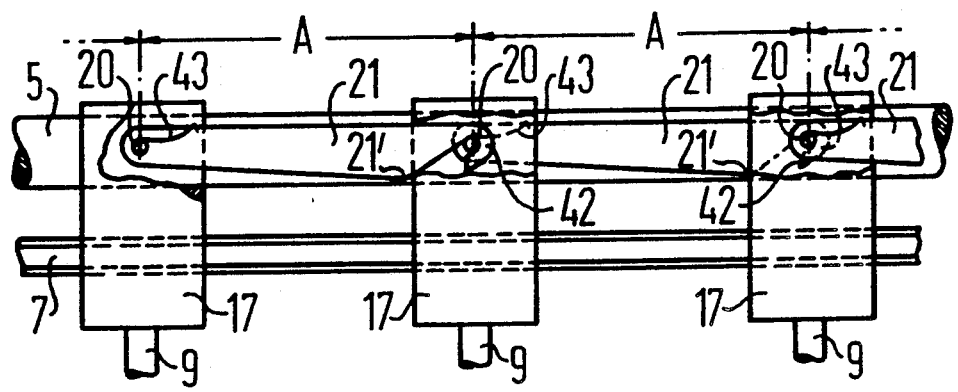
FIG. 5 is a schematic side view showing how adjacent carriage assemblies are coupled together such that they are maintained at predetermined spaced-apart intervals along the length of the guide rail illustrated in FIG. 4.

Referring to FIGS. 1-3, there is shown a vertical Venetian blind 2 having upper and lower guide rails 4 and 11 disposed horizontally at the respective upper and lower ends of a window 1. The upper and lower rails 4 and 11 cooperate to support a plurality of vertically oriented slats 3. Each slat 3 is made of a refractive material, such as plastic, and has opposing surfaces 37 and 38. A bracing rib 39 (see FIG. 2) is provided on the surface 37 of each slat 3 to prevent the slat 3 from warping. The surface 38 of each slat 3 has a prismatic configuration designed for retro-reflection of incoming solar rays S.

With particular reference to FIG. 3, a support rod 9 extends upwardly from an upper end of each slat 3. One end of the support rod 9 has a lock shoe 9', which is received in a slot 39' formed in the bracing rib 39 of the slat 3 (see FIG. 3). The other end of the support rod 9 is rotatably received in a leading carriage 17 adapted for movement within and along the upper guide rail 4 in a manner to be described hereinafter. A guide pin 10 extends downwardly from a lower end of each slat 3 into a longitudinal slot 12 provided in the lower guide rail 11 (see FIG. 1). The support rod 9 and the guide pin 10 cooperate to allow the slat 3 to rotate about its longitudinal axis and to move the slat 3 along the upper and lower guide rails 4 and 11. To mount the blind 2 over the window 1, the upper and lower guide rails 4 and 11 can be attached to a ceiling or wall, or to the window 1 itself. However, the upper and lower guide rails 4 and 11 must be spaced from the window 1 to allow for free rotation and movement of the slats 3.

Referring still to FIGS. 1-3, the upper guide rail 4 has a hollow rectangular profile so that it can house the mechanism for moving the slats 3 along the upper and lower guide rails 4 and 11. This mechanism, which will be described in detail hereinafter, is actuated by a drive shaft, which extends along the upper guide rail 4 and which is rotated by an electric motor 6. The upper guide rail 4 also houses a mechanism to rotate the slats 3. This mechanism, which will be described in detail hereinafter, is actuated by a tilt rod 7, which has a polygonal cross-sectional shape and which extends along the upper guide rail 4 such that it can be rotated by an electric motor 8.

With particular reference to FIG. 3, the lower guide rail 11 houses a mechanism to lock the slats 3 in place. This mechanism includes a fastening angle 40, which extends along the interior of the lower guide rail 11. A plurality of V-shaped slots 41 is provided in an edge of the fastening angle 40. The locations of the slots 41 correspond to the positions of the guide pins 10 when the blind 2 is closed. One end of the fastening angle 40 is connected to a shaft 14, which is rotated by an electric motor 13. By rotating the shaft 14 through an angle of 90 degrees, the slots 41 can be positioned so as to receive their corresponding guide pins 10, thereby locking the slats 3 in place.

The electric motors 6, 8 and 13 are controlled by an electronic control unit 15 (see FIGS. 1 and 2). To move the blind 2 to its closed position (see FIG. 1), the control unit 15 commands the electric motor 6 to move the slats 3 along the upper and lower guide rails 4 and 11. Next, the control unit 15 commands the electric motor 8 to rotate the slats 3 until the surfaces 37 oppose the window 1. Finally, the control unit 15 commands the electric motor 13 to lock the slats 3 in place. In the closed position of the blind 2, the slats 3 are positioned so as to form a sunshield that retro-reflects incident solar rays S.

In order to maintain the condition for retro-reflection as the position of the sun changes, the slats 3 must be adjusted periodically. More particularly, for the prismatic surfaces 38 to reflect light, the surfaces 37 of the slats 3 must be positioned perpendicular to the incoming solar rays S. Therefore, as the bearing and elevation of the sun changes, the slats 3 must be rotated to maintain the desired perpendicular relationship between the solar rays S and the surfaces 37 of the slats 3. To compensate for such changes, a light sensor 16 is provided which tracks the position of the sun and transmits the position to the control unit 15, which formulates the change in incident angle and actuates the electric motor 8 to rotate the slats 3 by an appropriate amount. The use of the electronic control unit 15 and the light sensor 16 to control the rotation of the slats 3 is known in the prior art (see, for example, U.S. Pat. No. 4,841,672, which is owned by the assignee of the present application).

To move the blind 2 to its open position (see FIG. 2) the control unit 15 commands the electric motor 13 to unlock the guide pins 10. Then, the control unit 15 commands the electric motor 8 to rotate the slats 3 until they are generally perpendicular to the window 1. Finally, the control unit 15 commands the electric motor 6 to draw the slats 3 together.

Referring now to FIGS. 3 and 4, the upper guide rail 4 includes a frame 4'', which has a groove 32 provided on its upper surface. A cover 4' slides into the groove 32 and cooperates to form a slot 35 which extends longitudinally along the underside of the upper guide rail 4. Mounting grooves 31 are provided on the top of the frame 4'' for fastening the guide rail 4 to the ceiling. A cover fillet 33 closes off the space between the cover 4' and the ceiling.

The leading carriage 17 (see FIGS. 3 and 4) and a plurality of trailing carriages 17' (see FIGS. 5-7) are located within the upper guide rail 4. Flanges 18 located on opposite sides of each of the carriages 17 and 17' ride in tracks 34 disposed horizontally along the length of the frame 4''. The flanges 18 and tracks 34 cooperate to allow the carriages 17 and 17' to slide along the entire length of the frame 4''. Each of the carriages 17 and 17' is attached to a corresponding one of the slats 3 by the support rod 9 associated with such slat, the support rod 9 extending through the slot 35 in the upper guide rail 4. A worm gear 23 is mounted on the end of the support rod 9 which terminates in the carriage 17. Worm screws 22 are connected to the tilt rod 7 such that each of the worm screws 22 meshes with a corresponding one of the worm gears 23. By rotating the tilt rod 7, the slats 3 are rotated about their longitudinal axes. The tilt rod 7 can rotate the slats 3 through approximately 180 degrees: 90 degrees in a clockwise direction and 90 degrees in a counterclockwise direction.

The drive shaft 5 functions to move the leading carriage 17 along the frame 4''. More particularly, an arcuate member 24 having a 120 degree arc and internal threads is attached to the top surface of the leading carriage 17 such that the threads of the arcuate member 24 threadedly engage external threads provided on the drive shaft 5 (i.e., the arcuate member 24 envelops or embraces $\frac{1}{3}$ of the circumference of the drive shaft 5). Thus, as the drive shaft 5 is rotated, the arcuate member 24 and hence the leading carriage 17 are moved along the frame 4''.

A bearing support structure 26 is attached to the frame 4'' and includes two vertical inner legs 27, a horizontal crosspiece 28, which connects the inner legs 27, and a vertical middle leg 29, which extends downward from the crosspiece 28. Projections 30 are located at the free ends of the inner legs 27 for a purpose which will be described hereinafter.

A bearing assembly 25 is attached to the bearing support structure 26. The bearing assembly 25, which can be made from any suitable material such as polyamide plastic, is attached to the middle leg 29 and to the projections 30 on the inner legs 27 of the bearing support structure 26. Alternatively, the bearing assembly 25 could be formed monolithically with the bearing support structure 26, whereby they would constitute a single piece. By reason of its arcuate design (i.e., it being genrally C-shaped in transverse cross section), the bearing assembly 25 envelops or embraces $\frac{2}{3}$ of the circumference of the drive shaft 5 (i.e., the 240 degree portion not enveloped by the arcuate member 24). Thus, the bearing assembly 25 allows for the free rotation of the drive shaft 5, and, more importantly, prevents the drive shaft 5 from sagging by supporting it over its entire length.

Referring now to FIG. 3 only, the leading carriage 17 has two levers 21 and two pairs of parallel slots 19. The two pairs of parallel slots 19 are located at opposite sides of the carriage 17 on the upper surface thereof. A journal 20 extends through each pair of the slots 19. One slot of each pair of slots 19 cooperates with its associated journal 20 to form a pivot for a corresponding one of the levers 21, while the other slot is provided for a purpose will be described in connection with the following discussion of FIGS. 5–7.

Figure 6:
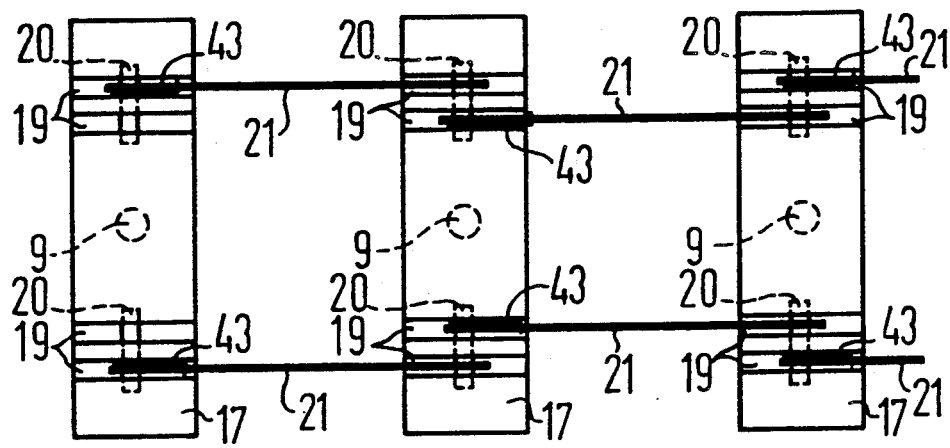
FIG. 6 is a schematic top view of the carriage assemblies illustrated in FIG. 5.
Figure 7:
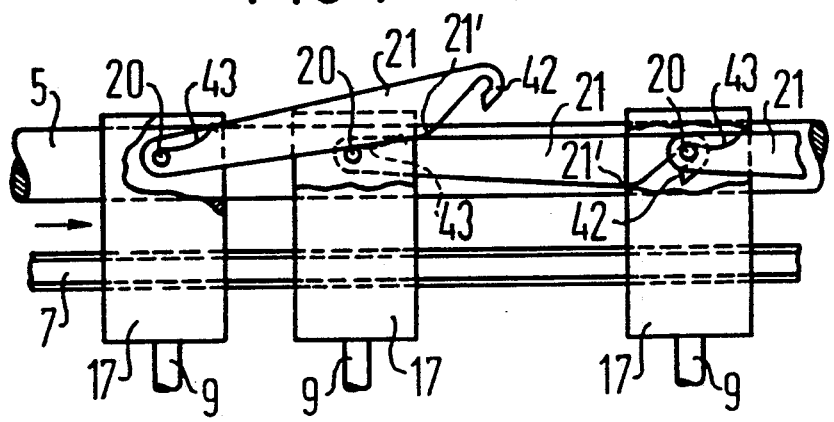
FIG. 7 is another schematic side view showing how the carriage assemblies of FIGS. 5 and 6 are uncoupled from each other.

With reference now to FIGS. 5–7, three of the trailing carriages 17' are shown being interconnected by the levers 21. Except for the last of the trailing carriages 17 (which is not shown), all of the carriages 17' are basically the same as the leading carriage 17, except that they do not require the arcuate member 24. In addition to not requiring the arcuate member 24, the last of the trailing carriages 17 also does not require the levers 21.

Referring still to FIGS. 5-7, the levers 21 are arranged in the slots 19 of each of the carriages 17' in an alternating sequence (i.e., each of the levers 21 of the middle carriage is located in an inner one of the slots 19, while each of the levers 21 of the two adjacent carriages is located in an outer one of the slots 19). The levers 21 are also attached to their respective journals 20 by springs 43, which function to bias the levers 21 downward toward the journals 20 of an adjacent one of the carriages 17'. Although not shown in FIG. 3 or in FIGS. 5-7, the leading carriage 17 would also be provided with the springs 43 for biasing its levers 21 in a downward direction.

Referring still again to FIGS. 5-7, each of the levers 21 has a free end 42, which is hook-shaped in order to engage the journal 20 of an adjacent one of the carriages 17' when the carriages 17' are being moved apart (see FIGS. 5-6). A cam-like contour 21' is located on the underside of the free end 42 of each of the levers 21 to interact with the journal 20 of an adjacent one of the carriages 17'. The cam-like contour 21' forces the lever 21 upward as two adjacent carriages 17' are being moved together (see FIG. 7), thereby disengaging the carriages 17'. The levers 21 enable the carriages 17' to be spaced at precise center-to-center distances A. This precise spacing is essential because the slats 3 must be precisely positioned when the blind 2 is closed so that it can be used as a retro-reflective sunshield. In a typical installation, the width of each slat 3 is 56 millimeters and the distance A is 57 millimeters.

Another exemplary embodiment of the present invention is illustrated in FIGS. 8-11. Elements illustrated in FIGS. 8-11 which correspond to the elements described above with respect to FIGS. 3 and 4 have been designated by corresponding reference numerals increased by one hundred. Elements illustrated in FIGS. 8-11 have the same structure as the corresponding elements in FIGS. 3 and 4, unless otherwise stated.

With reference to FIG. 8, a nut 124 is provided with internal threads (not shown) which mesh with external threads provided on a rotatable drive shaft 105. The nut 124 is attached to a leading carriage 117 in order to advance the carriage 117 along the drive shaft 105 as it rotates. The nut 124 has lateral grooves 154 which slidably engage projections 130 on inner legs 127 of a bearing support structure 126. The nut 124 also has a top groove 153, which slidably engages a middle leg 129 of the bearing support structure 126, and two pairs of longitudinal slots 152 on opposite sides of the top groove 153. Latch pins 155 traverse the slots 152.

Referring now to FIGS. 9-11, two bearing collars 145, 145' are mounted on the drive shaft 105 along with the nut 124, each collar being associated with a corresponding one of a plurality of trailing carriages (not shown). With particular reference to FIGS. 10 and 11, the collar 145 is provided with a latch mechanism 146, including an arm 156 having a bore 150 at one end thereof. The bore 150 receives a latch pin 151 so that the arm 156 can pivot about the latch pin 151, which is carried by the collar 145. The opposite end of the arm 156 terminates in a catch hook 147. The arm 156 is biased downwardly by a spring 149 connected between the arm 156 and the collar 145. The latch mechanism 146 also includes a stem 148, which is attached at a right angle to the end of the arm 156 having the bore 150. The requisite length of the stem 148 will become apparent hereinafter.

When the nut 124 is moved away from the collars 145 and 145' (i.e., when the blind is being closed), the catch hook 147 of the collar 145 engages one of the latch pins 155 of the nut 124, while a catch hook 147' of the collar 145' engages one of the latch pins 151 of the collar 145. Thus, the collars 145 and 145' are interconnected to each other and to the nut 124.

Stop pins 136 and 136' are fastened to the middle leg 129 of the bearing support structure 126 at predetermined locations along the length of upper guide rail 104. The height of the pins 136 and 136' corresponds to the length of the stem 148 of the collar 145 and the length of a stem 148' of the collar 145', respectively. As the nut 124 moves the collars 145 and 145' along the drive shaft 105, the pins 136 and 136' contact the stems 148 and 148', respectively, thereby causing the collars 145 and 145' to be disengaged from each other and from the nut 124. Once disengaged, the collars 145 and 145' support the drive shaft 105 at predetermined locations along the length thereof, thereby inhibiting it from sagging.

It will be understood that the embodiments described herein are merely exemplary and that a person skilled in the art may make many variations and modifications without departing from the spirit and scope of the invention. All such modifications are intended to be included within the scope of the invention as defined in the appended claims.

What is claimed is:

1. A vertical Venetian blind, comprising a plurality of blocking means for blocking solar rays; supporting means for supporting each of said blocking means in a generally vertical orientation; moving means for moving said blocking means along said supporting means between a closed position and an open position; rotating means for rotating each of said blocking means about a generally vertical axis of rotation associated therewith; and coupling means for coupling and uncoupling adjacent pairs of said blocking means in response to the movement of said blocking means along said supporting means, said coupling means including a plurality of spacer bars, each spacer bar being pivotally attached to one blocking means of a corresponding one of said adjacent pairs of said blocking means and being pivotal between a first position in which it is disengaged from the other blocking means of said corresponding one of said adjacent pairs of blocking means and a second position in which it is engaged with said other blocking means to thereby maintain a predetermined spacing between said one blocking means and said other blocking means, all of said spacer bars being in their second position when said blocking means are in their closed position, whereby said blocking means are spaced apart at predetermined intervals along said supporting means when they are in their closed position.

2. A vertical Venetian blind according to claim 1, wherein each of said spacer bars is rigid to thereby inhibit any deviation in said predetermined spacing between adjacent blocking means when said blocking means are in their closed position.

3. A vertical Venetian blind according to claim 1, wherein said spacer bar of said one blocking means includes engaging means for releasably engaging said other blocking means.

4. A vertical Venetian blind according to claim 3, wherein said engaging means includes a hook provided on a free end of said spacer bar.

5. A vertical Venetian blind according to claim 4, wherein said other blocking means includes receiving means for receiving said free end of said spacer bar and a journal located within said receiving means so as to be engageable by said hook of said spacer bar.

6. A vertical Venetian blind according to claim 5, wherein said receiving means includes a slot formed in said other blocking means.

7. A vertical Venetian blind according to claim 5, wherein said one blocking means includes urging means for urging said spacer bar into said receiving means of said other blocking means.

8. A vertical Venetian blind according to claim 7, wherein said urging means includes a spring.

9. A vertical Venetian blind according to claim 5, wherein said spacer bar of said one blocking means includes disengaging means for disengaging said hook of said spacer bar from said journal of said receiving means.

10. A vertical Venetian blind according to claim 9, wherein said disengaging means includes a cam-like surface located so as to slidably engage said journal of said receiving means, said cam-like surface having a shape designed to move said spacer bar away from said journal in response to the movement of said one blocking means towards said other blocking means.

11. A vertical Venetian blind according to claim 1, wherein each of said blocking means includes a slat made of a refractive material, one side of said slat having a prismatic contour designed to retro-reflect incoming solar rays when an opposite side of said slat is arranged generally perpendicular to the incoming solar rays.

12. A vertical Venetian blind according to claim 11, wherein each of said blocking means includes a carriage slidably mounted on said supporting means, a corresponding one of said slats depending from said carriage and being rotatable relative thereto.

13. A vertical Venetian blind according to claim 1, wherein said moving means includes a rotatable drive shaft extending along said supporting means and having external threads provided thereon and an arcuate member attached to a leading one of said blocking means, said arcuate member having internal threads which threadedly engage said external threads of said drive shaft, whereby said arcuate member and hence said leading one of said blocking means moves along said drive shaft in response to the rotation thereof.

14. A vertical Venetian blind according to claim 13, wherein said supporting means includes mounting means for mounting said drive shaft therein, said mounting means including a bearing which embraces a major circumferential portion of said drive shaft and which is substantially coextensive with said drive shaft, whereby said drive shaft is supported along substantially its entire length to thereby inhibit it from sagging.

15. A vertical Venetian blind according to claim 14, wherein said arcuate member threadedly engages said drive shaft over a minor circumferential portion thereof.

16. A vertical Venetian blind according to claim 15, wherein said major circumferential portion is 240 degrees and said minor circumferential portion is 120 degrees.

17. A vertical Venetian blind according to claim 1, wherein all of said spacer bars are of the same length, whereby said predetermined intervals between adjacent blocking means are a uniform distance.

18. A vertical Venetian blind, comprising a plurality of blocking means for blocking solar rays; supporting means for supporting each of said blocking means in a generally vertical orientation; moving means for moving said blocking means along said supporting means between a closed position and an open position, said moving means including a rotatable drive shaft extending along said supporting means and having external threads provided thereon and an arcuate member attached to a leading one of said blocking means, said arcuate member having internal threads which threadedly engage said external threads of said drive shaft, whereby said arcuate member and hence said leading one of said blocking means moves along said drive shaft in response to the rotation thereof; rotating means for rotating each of said blocking means about a generally vertical axis of rotation associated therewith; coupling means for coupling and uncoupling adjacent pairs of said blocking means in response to the movement of said blocking means along said supporting means; and mounting means, housed in said supporting means, for mounting said drive shaft therein, said mounting means including a bearing which embraces a major circumferential portion of said drive shaft and which is substantially coextensive with said drive shaft, whereby said drive shaft is continuously supported along substantially its entire length to thereby inhibit it from sagging.

19. A vertical Venetian blind according to claim 18, wherein said arcuate member threadedly engages said drive shaft over a minor circumferential portion thereof.

20. A vertical Venetian blind according to claim 19, wherein said major circumferential portion is 240 degrees and said minor circumferential portion is 120 degrees.

21. A vertical Venetian blind according to claim 18, wherein said supporting means includes a guide rail having an interior compartment and suspending means located in said interior compartment for suspending said bearing within said guide rail.

22. A vertical Venetian blind according to claim 21, wherein said suspending means includes a plurality of legs depending from an upper surface of said guide rail and being rigidly attached to said bearing.

23. A vertical Venetian blind according to claim 22, wherein said legs are formed monolithically with said bearing.

24. A vertical Venetian blind according to claim 18, wherein each of said blocking means includes a slat made of a refractive material, one side of said slat having a prismatic contour designed to retro-reflect incoming solar rays when an opposite side of said slat is arranged generally perpendicular to the incoming solar rays.

25. A vertical Venetian blind according to claim 24, wherein each of said blocking means includes a carriage slidably mounted on said supporting means, a corresponding one of said slats depending from said carriage and being rotatable relative thereto.

* * * * *